(12) United States Patent
Prasad

(10) Patent No.: US 11,966,479 B2
(45) Date of Patent: Apr. 23, 2024

(54) SYSTEMS AND METHODS FOR EVALUATING, VALIDATING, AND IMPLEMENTING CHANGE REQUESTS TO A SYSTEM ENVIRONMENT BASED ON ARTIFICIAL INTELLIGENCE INPUT

(71) Applicant: BANK OF AMERICA CORPORATION, Charlotte, NC (US)

(72) Inventor: Khandavally Siva Ranga Prasad, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 257 days.

(21) Appl. No.: 17/582,282

(22) Filed: Jan. 24, 2022

(65) Prior Publication Data
US 2023/0237165 A1    Jul. 27, 2023

(51) Int. Cl.
*G06F 21/60* (2013.01)
*G06N 5/04* (2023.01)
*G06N 20/20* (2019.01)

(52) U.S. Cl.
CPC ............ *G06F 21/602* (2013.01); *G06N 5/04* (2013.01); *G06N 20/20* (2019.01); *G06F 2221/2141* (2013.01)

(58) Field of Classification Search
CPC ..... G06F 21/572; G06F 8/65; H04L 63/1433; H04L 63/20; H04L 63/108; G06N 20/00
See application file for complete search history.

(56) References Cited

U.S. PATENT DOCUMENTS

| | | |
|---|---|---|
| 6,480,955 B1 | 11/2002 | Dekoning et al. |
| 7,024,548 B1 | 4/2006 | O'Toole, Jr. |
| 7,590,669 B2 | 9/2009 | Yip et al. |
| 7,761,530 B2 | 7/2010 | Cain et al. |
| 9,853,863 B1 | 12/2017 | Chandrashekar et al. |
| 10,924,347 B1 | 2/2021 | Narsian et al. |
| 11,132,181 B1 | 9/2021 | Stelmar Netto et al. |
| 11,290,325 B1 | 3/2022 | Kaluza et al. |
| 11,675,917 B2 | 6/2023 | Kumar et al. |
| 11,676,105 B2 | 6/2023 | Verma |
| 2002/0188778 A1 | 12/2002 | Iwanojko et al. |
| 2003/0055529 A1 | 3/2003 | Aosawa |
| 2020/0034133 A1* | 1/2020 | Dattatri ................ G06F 8/65 |
| 2020/0250675 A1* | 8/2020 | Hanis ............ G06Q 20/4016 |

(Continued)

*Primary Examiner* — Olugbenga O Idowu
(74) *Attorney, Agent, or Firm* — Moore & Van Allen PLLC; R.W. McCord Rayburn

(57) ABSTRACT

Systems, computer program products, and methods are described herein for evaluating, validating, and implementing change requests to a system environment based on artificial intelligence input. The present invention may be configured to receive a change request including a change to be made to a configuration item of a system environment, determine, based on a change inference database, potential failure points associated with deploying the change request in the system environment, and determine, based on the potential failure points, a confidence score for the change. The present invention may be configured to determine whether the confidence score for the change satisfies a threshold limit for the configuration item and prevent the change request from being deployed in the system environment until the confidence score for the change satisfies the threshold limit for the configuration item.

20 Claims, 4 Drawing Sheets

(56) References Cited

U.S. PATENT DOCUMENTS

2022/0051361 A1    2/2022  Cella et al.
2022/0156134 A1    5/2022  Lehmann et al.
2022/0345457 A1*  10/2022  Jeffords .............. G06F 21/6218
2023/0216738 A1    7/2023  Woodworth et al.

* cited by examiner

SYSTEMS AND METHODS FOR EVALUATING, VALIDATING, AND IMPLEMENTING CHANGE REQUESTS TO A SYSTEM ENVIRONMENT BASED ON ARTIFICIAL INTELLIGENCE INPUT

FIELD OF THE INVENTION

The present invention embraces systems and methods for evaluating, validating, and implementing change requests to a system environment based on artificial intelligence input.

BACKGROUND

An electronic system may be configured to determine whether a user is authorized to make changes to a system environment. In response to determining that the user is authorized, the electronic system may implement a change request, provided by the user, including changes to be made to configuration items in a system environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for evaluating, validating, and implementing change requests to a system environment based on artificial intelligence input. The system may include at least one non-transitory storage device and at least one processing device coupled to the at least one non-transitory storage device, where the at least one processing device may be configured to receive a change request including a change to be made to a configuration item of a system environment and determine, based on a change inference database, potential failure points associated with deploying the change request in the system environment, where the change inference database is generated based on historical change request data. The at least one processing device may be configured to determine, based on the potential failure points, a confidence score for the change and determine whether the confidence score for the change satisfies a threshold limit for the configuration item, where the threshold limit is a baseline value to approve changes to the configuration item. The at least one processing device may be configured to prevent the change request from being deployed in the system environment until the confidence score for the change satisfies the threshold limit for the configuration item, generate, based on determining that the confidence score for the change satisfies the threshold limit for the configuration item, an authentication token including instructions for deployment tools, and implement, using the deployment tools and based on the instructions, the change request in the system environment.

In some embodiments, the at least one processing device may be configured to generate, based on the historical change request data, the change inference database. Additionally, or alternatively, the at least one processing device may be configured to, when generating the change inference database, generate the change inference database using a first machine learning model, where the first machine learning model is trained based on the historical change request data. In some embodiments, the at least one processing device may be configured to, when generating the change inference database, analyze the historical change request data using natural language processing, and, when determining the potential failure points associated with deploying the change request in the system environment, analyze the change request using the natural language processing. Additionally, or alternatively, the at least one processing device may be configured to, after implementing the change request in the system environment, retrain the first machine learning model based on the historical change request data, the change request, and an outcome of implementing the change request in the system environment and update the change inference database using the first machine learning model.

In some embodiments, the at least one processing device may be configured to determine, based on the historical change request data, the threshold limit for each configuration item of the system environment. Additionally, or alternatively, the at least one processing device may be configured to, when determining the threshold limit for each configuration item of the system environment, determine the threshold limit for each configuration item of the system environment using a second machine learning model, where the second machine learning model is trained based on the historical change request data. In some embodiments, the at least one processing device may be configured to, after implementing the change request in the system environment, retrain the second machine learning model based on the historical change request data, the change request, and an outcome of implementing the change request in the system environment and update the threshold limit for each configuration item of the system environment using the second machine learning model.

In some embodiments, the at least one processing device may be configured to, when preventing the change request from being deployed in the system environment, generate, based on determining that the confidence score for the change satisfies the threshold limit for the configuration item, based on the change, and based on a change window for the change request, a secure token for the change request, where the secure token is only valid during the change window. Additionally, or alternatively, the at least one processing device may be configured to, when preventing the change request from being deployed in the system environment, determine whether the secure token is valid. In some embodiments, the at least one processing device may be configured to, when generating the authentication token, generate the authentication token based on determining that the secure token is valid, based on a deployment tool database, and based on the secure token.

In some embodiments, the change request may include multiple changes to be made to the configuration item and other changes to be made to other configuration items of the system environment, and the at least one processing device may be configured to, when determining the confidence score, determine, based on the potential failure points, confidence scores for the multiple changes and other confidence scores for the other changes and, when determining whether the confidence score for the change satisfies the threshold limit for the configuration item, determine whether the confidence scores for the multiple changes satisfy the threshold limit for the configuration item and determine whether the other confidence scores for the other changes satisfy other threshold limits for the other configuration items.

In some embodiments, the at least one processing device may be configured to determine, based on the historical change request data, classifications for historical change requests, where the classifications include configuration items of the system environment, and determine, based on the change request, the classifications impacted by the change request.

In some embodiments, the confidence score may be a probability of successful implementation of the change request in the system environment without negatively impacting other configuration items in the system environment.

In another aspect, the present invention embraces a computer program product for evaluating, validating, and implementing change requests to a system environment based on artificial intelligence input. The computer program product may include a non-transitory computer-readable medium including code causing a first apparatus to receive a change request including a change to be made to a configuration item of a system environment and determine, based on a change inference database, potential failure points associated with deploying the change request in the system environment, where the change inference database is generated based on historical change request data. The non-transitory computer-readable medium may include code causing the first apparatus to determine, based on the potential failure points, a confidence score for the change and determine whether the confidence score for the change satisfies a threshold limit for the configuration item, where the threshold limit is a baseline value to approve changes to the configuration item. The non-transitory computer-readable medium may include code causing the first apparatus to prevent the change request from being deployed in the system environment until the confidence score for the change satisfies the threshold limit for the configuration item, generate, based on determining that the confidence score for the change satisfies the threshold limit for the configuration item, an authentication token including instructions for deployment tools, and implement, using the deployment tools and based on the instructions, the change request in the system environment.

In some embodiments, the non-transitory computer-readable medium may include code causing the first apparatus to generate, based on the historical change request data, the change inference database. Additionally, or alternatively, the non-transitory computer-readable medium may include code causing the first apparatus to, when generating the change inference database, generate the change inference database using a first machine learning model, where the first machine learning model is trained based on the historical change request data. In some embodiments, the non-transitory computer-readable medium may include code causing the first apparatus to, when generating the change inference database, analyze the historical change request data using natural language processing, and when determining the potential failure points associated with deploying the change request in the system environment, analyze the change request using the natural language processing. Additionally, or alternatively, the non-transitory computer-readable medium may include code causing the first apparatus to, after implementing the change request in the system environment, retrain the first machine learning model based on the historical change request data, the change request, and an outcome of implementing the change request in the system environment and update the change inference database using the first machine learning model.

In yet another aspect, a method for evaluating, validating, and implementing change requests to a system environment based on artificial intelligence input is presented. The method may include receiving a change request including a change to be made to a configuration item of a system environment, determining, based on a change inference database, potential failure points associated with deploying the change request in the system environment, where the change inference database is generated based on historical change request data, and determining, based on the potential failure points, a confidence score for the change. The method may include determining whether the confidence score for the change satisfies a threshold limit for the configuration item, where the threshold limit is a baseline value to approve changes to the configuration item, and preventing the change request from being deployed in the system environment until the confidence score for the change satisfies the threshold limit for the configuration item. The method may include generating, based on determining that the confidence score for the change satisfies the threshold limit for the configuration item, an authentication token including instructions for deployment tools and implementing, using the deployment tools and based on the instructions, the change request in the system environment.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
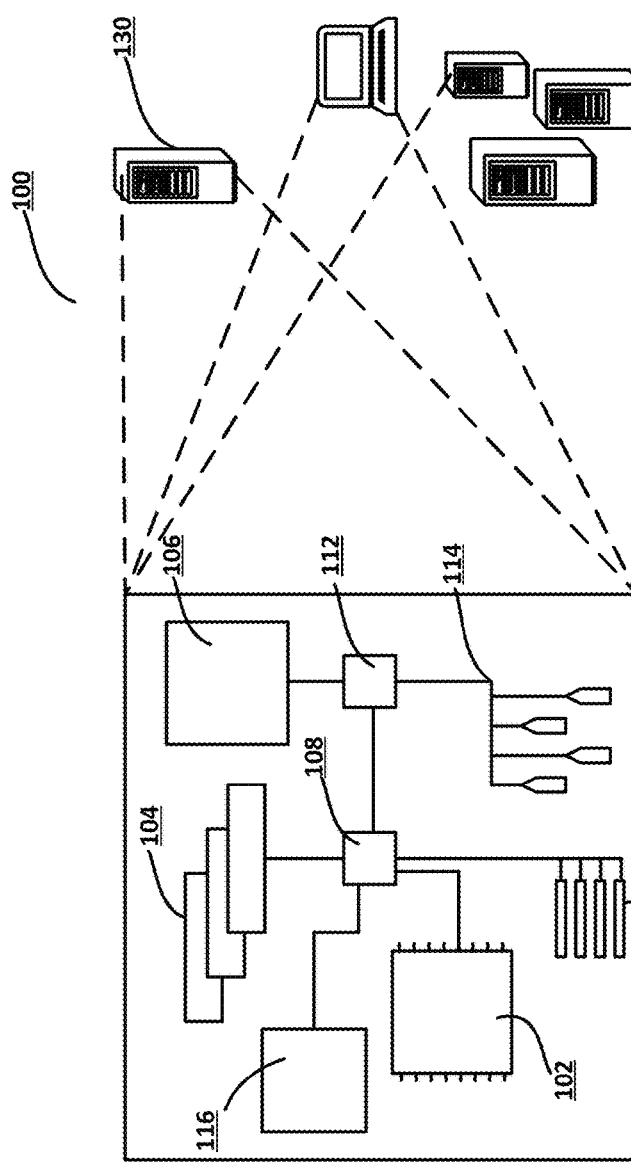
Figure 1:
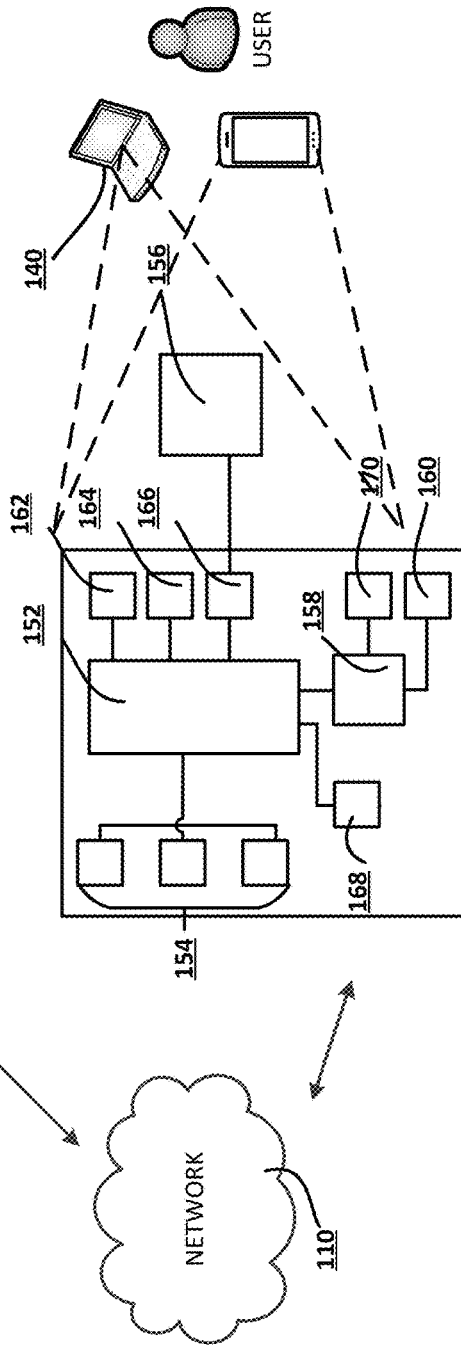
Figure 2:
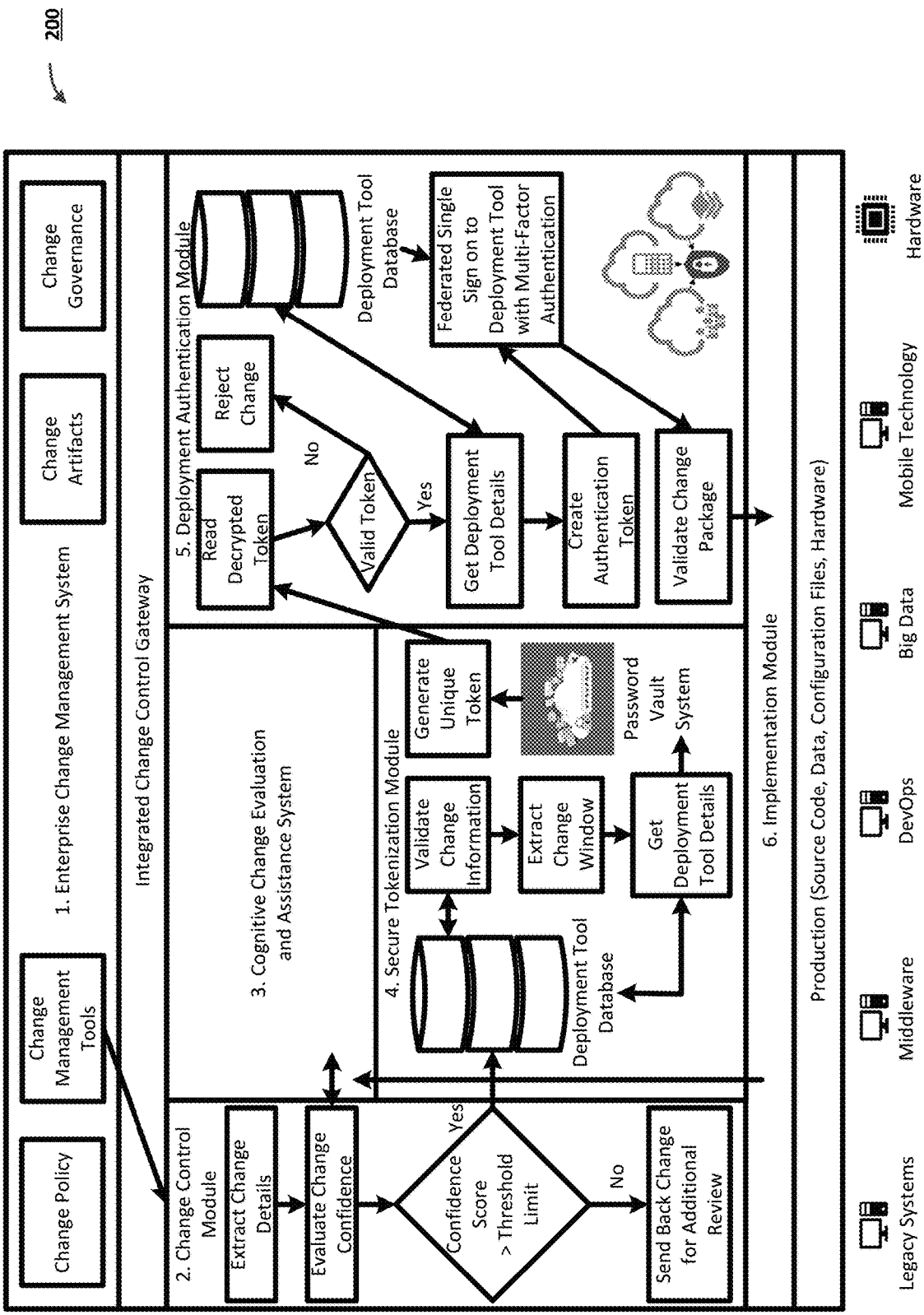
Figure 3:
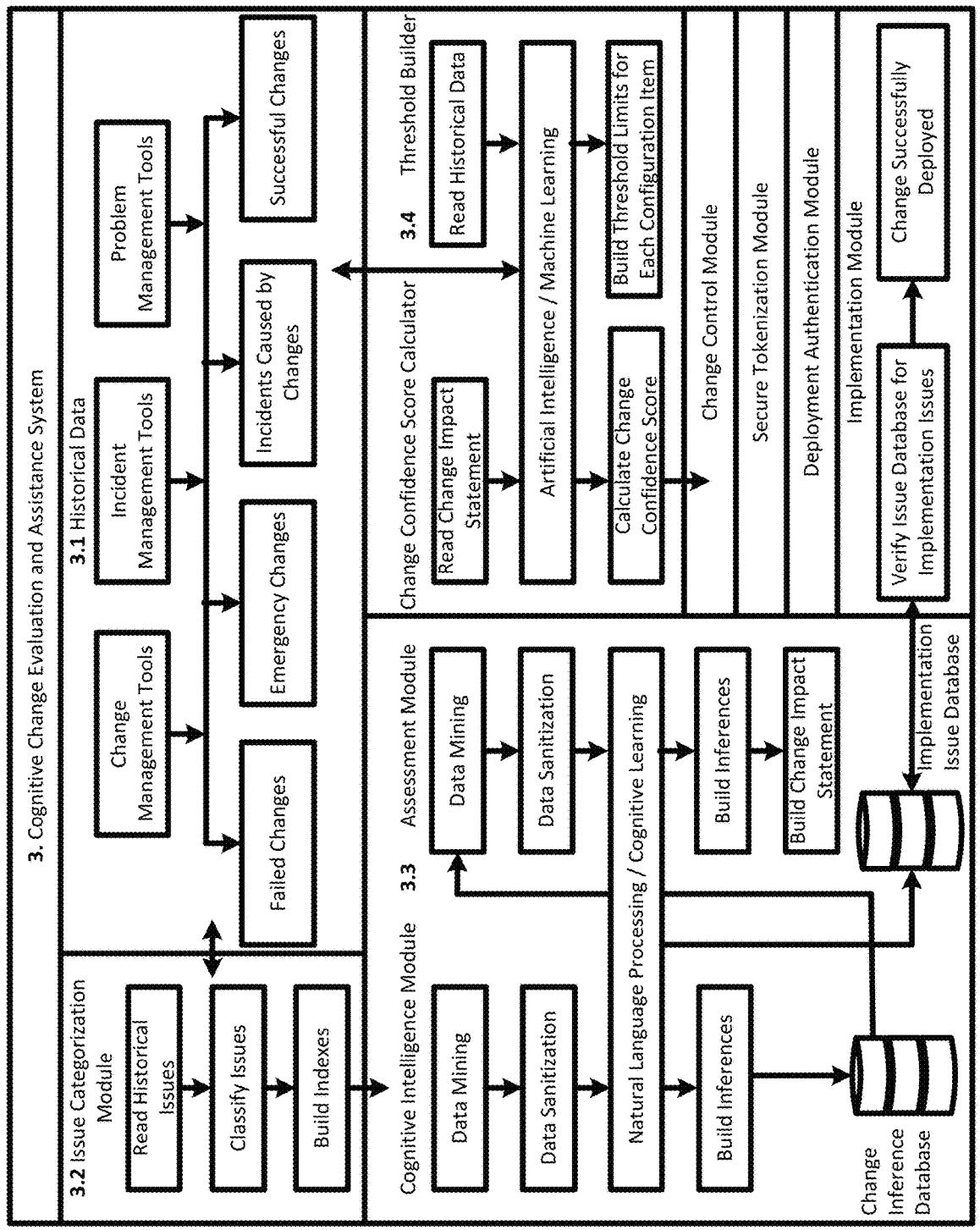
Figure 4:
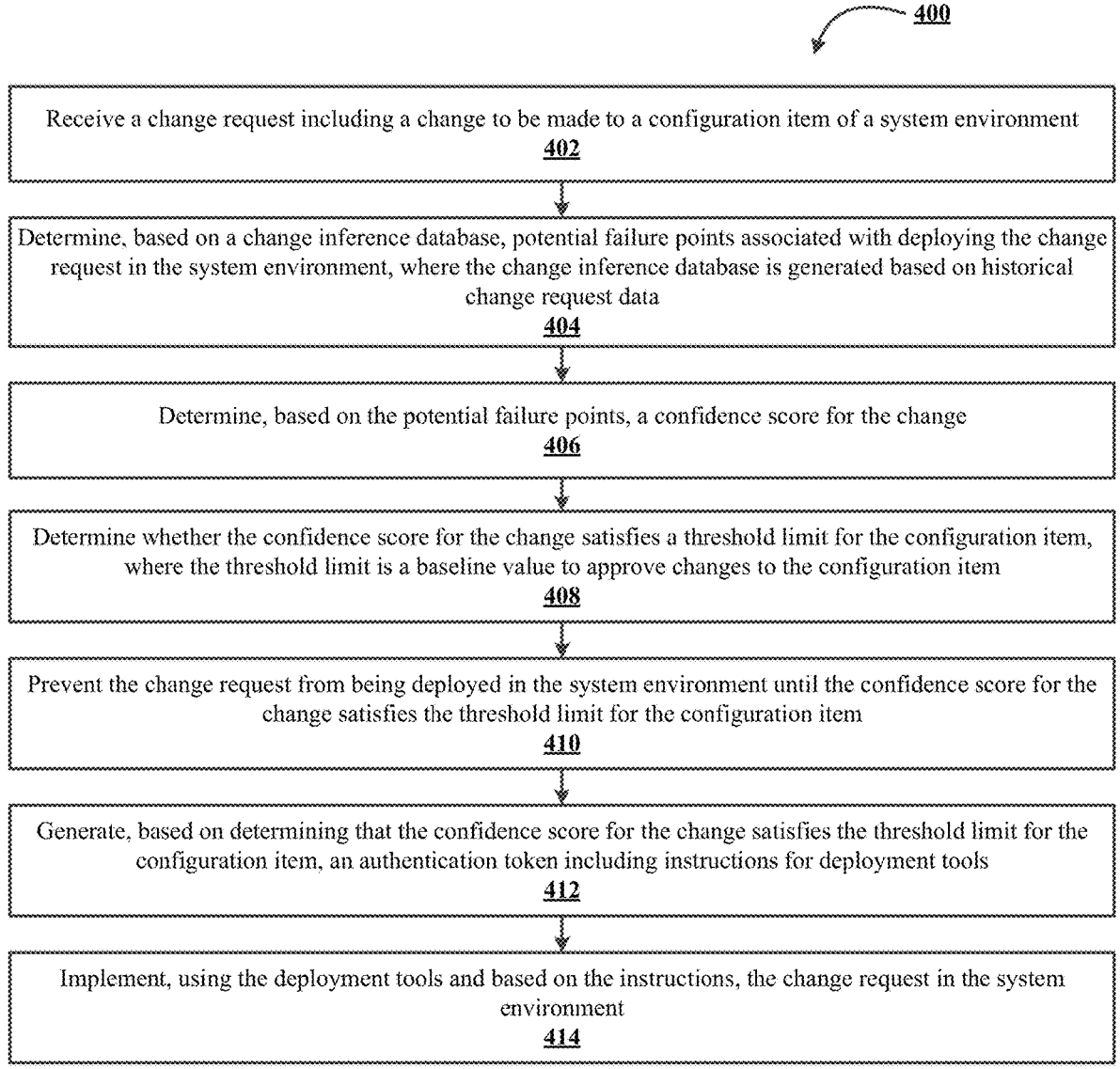

Having thus described embodiments of the invention in general terms, reference will now be made the accompanying drawings, wherein:

FIG. 1 illustrates technical components of a system for evaluating, validating, and implementing change requests to a system environment based on artificial intelligence input, in accordance with an embodiment of the invention;

FIG. 2 illustrates a process flow for evaluating, validating, and implementing change requests to a system environment based on artificial intelligence input, in accordance with an embodiment of the invention;

FIG. 3 illustrates a process flow for evaluating, validating, and implementing change requests to a system environment based on artificial intelligence input, in accordance with an embodiment of the invention; and FIG. 4 illustrates a process flow for evaluating, validating, and implementing change requests to a system environment based on artificial intelligence input, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a"

and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to determine whether a user is authorized to make changes to a system environment. In response to determining that the user is authorized, the electronic system may implement a change request, provided by the user, including changes to be made to configuration items in a system environment. However, even authorized users may provide change requests that, when implemented and/or deployed in the system environment, cause negative impacts to one or more elements of the system environment, such as systems, data structures, source code, configuration files, data, hardware, and/or the like. Identifying, repairing, reporting, and/or the like of such negative impacts would consume significant computing resources, network resources, and financial resources. As an example, if the change request includes a change to a configuration item (e.g., a system, a data structure, source code, a configuration file, data, hardware, and/or the like), the unauthorized user may not be aware that if the configuration item is changed other configuration items must also be changed to maintain proper function of the system environment. When implemented, the change to the configuration item could crash one or more elements of the system, cause elements and/or the system environment to function improperly, and/or the like. Furthermore, the authorized user may have limited data for determining whether the change to the configuration item would have negative impacts. Available data may be limited in scope without providing a holistic view of the interoperable elements of the system environment. Even if enough data was available to such users, the users querying databases of information with the data and then processing the data to obtain some meaningful conclusion would consume significant computing resources, network resources, and financial resources.

Some embodiments described herein provide a system, a computer program product, and/or a method for evaluating, validating, and implementing change requests to a system environment based on artificial intelligence input. For example, a system (e.g., an electronic system for evaluating, validating, and implementing change requests to a system environment based on artificial intelligence input and/or the like) may be configured to receive change requests including changes to be made to configuration items in a system environment. The system may be configured to determine potential failure points associated with deploying the change requests in the system environment based on a change inference database generated using artificial intelligence and historical change request data. The system may be configured to determine confidence scores for the changes and whether the confidence scores satisfy threshold limits for the configuration items, where the threshold limits are baseline values to approve changes to the configuration items. The system may be configured to generate the confidence scores and the threshold limits using artificial intelligence and historical change request data. The system may be configured to prevent the change requests from being deployed in the system environment until the confidence scores satisfy the threshold limits. If the confidence scores satisfy the threshold limits, the system may be configured to generate authentication tokens for the change requests that include instructions for deployment tools, and then implement the change requests in the system environment using the deployment tools. The system may be configured to continuously update the confidence scores and threshold limits using artificial intelligence. By automatically evaluating the change requests using the change inference database, the confidence scores, and the threshold limits, the system conserves resources (e.g., financial resources, computing resources, network resources, and/or the like) that would otherwise be consumed by identifying, repairing, reporting, and/or the like negative impacts of the change requests on the system environment, users querying databases of information with the data and then processing the data to obtain some meaningful conclusion regarding potential negative impacts, and/or the like.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for evaluating, validating, and implementing change requests to a system environment based on artificial intelligence input within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for evaluating, validating, and implementing change requests to a system environment based on artificial intelligence input, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more enterprise change management systems, integrated change control gateway systems, change control modules, cognitive change evaluation and assistance systems, secure tokenization modules, deployment authentication modules, implementation modules, production modules and/or systems, legacy systems, middleware systems, development operations systems, big data systems, mobile technology systems, and/or hardware systems (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more enterprise change management systems, integrated change control gateway systems, change control modules, cognitive change evaluation and assistance systems, secure tokenization modules, deployment authentication modules, implementation modules, and/or production modules and/or systems may perform one or more of the steps described herein with respect to the process flows described herein with respect to FIGS. 2-4.

FIG. 2 illustrates a process flow 200 for evaluating, validating, and implementing change requests to a system environment based on artificial intelligence input, in accordance with an embodiment of the invention. In some embodiments, one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 200.

As shown in FIG. 2, the process flow 200 may include an enterprise change management system, an integrated change control gateway system, a change control module, a cognitive change evaluation and assistance system, a secure tokenization module, a deployment authentication module, an implementation module, a production module and/or system, one or more legacy systems, one or more middleware systems, one or more development operations systems, one or more big data systems, one or more mobile technology systems, one or more hardware systems, and/or the like. As also show in FIG. 2, the enterprise change management system may include and/or store one or more change policies, one or more change management tools, one or more change artifacts, and one or more change governance modules and/or systems.

An entity's information technology system may include many components, elements, configuration items, and/or the like in production, such as source code, data configuration files, hardware, and/or the like. Performance of such components, elements, configuration items, and/or the like may determine an experience of a user (e.g., a customer) with the entity. Accordingly, changes implemented in production may impact production stability, which can lead to negative reputational impacts to the entity.

In conventional system environments, changes implemented in production may cause issues because the changes are not properly assessed before the changes are deployed in production. Thus, unwanted changes may be pushed into production, thereby forcing restoration of the system environment by a production team, which consumes significant computing resources, network resources, and financial resources.

In some conventional system environments, entities may have change management tools, change governance bodies (e.g., committees and/or the like), and/or change policies establishing standards to which production changes must adhere. However, such change management tools, change governance bodies, and/or change policies do not directly communicate with deployment tools and/or implementation modules that push the changes into production.

Furthermore, deployment tools and/or implementation modules do not have any dependence on change management tools, change governance bodies, and/or change policies. Conventionally, a user manually checks whether a change deployed in production is associated with a change request. Thus, changes may be pushed into production without a change request, which can negatively impact the system environment. Additionally, changes may not be tested properly and/or changes may not be approved but the changes are still pushed into production, which can also negatively impact the system environment.

To remedy such issues, and as shown in FIG. 2, some embodiments of the process flow 200 include preventing changes from being moved into production without a valid change request that has been tested and/or evaluated. Additionally, or alternatively, some embodiments of the process flow 200 include automatically assessing and/or evaluating changes based on, for example, criticality of a configuration item impacted by the change and/or historical data associated with change requests (e.g., historical change request data).

As shown in FIG. 2, the process flow 200 may include the enterprise change management system using the change policies, the change management tools, the change artifacts, and/or the change governance to generate a system of record for all code changes. In some embodiments, the process flow 200 may include defining, with the enterprise change management system, a workflow for a change request and tracking, with the enterprise change management system, each stage of the change request from planning, building, testing, deploying, and/or the like.

As shown in FIG. 2, the process flow 200 may include providing, with the enterprise change management system and/or the change management tools, the change request to the change control module. For example, the change management tools may provide, after determining that the change request complies with the change policies and/or the change governance, the change request to the change control module (e.g., through the integrated change control gateway).

As shown in FIG. 2, the process flow 200 may include extracting, with the change control module, change details from the change request and evaluating, with the change control module and the cognitive change evaluation and assistance system, a change confidence of the change and/or changes in the change request. For example, the process flow 200 may include performing one or more of the steps described herein with respect to FIG. 3 and process flow 300 to determine a confidence score for the change request and a threshold limit (e.g., associated with one or more configuration items affected by the change request). In some embodiments, the cognitive change evaluation and assistance system uses cognitive learning/natural language processing and artificial intelligence/machine learning to calculate the change confidence score.

As shown in FIG. 2, the process flow 200 may include determining whether the confidence score satisfies the threshold limit. For example, and as shown in FIG. 2, the process flow 200 may include determining whether the confidence score is greater than the threshold limit, where higher confidence scores are associated with higher likelihoods of change request not negatively impacting the system environment. Some embodiments are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As shown in FIG. 2, the process flow 200 may include sending back, based on determining that the confidence score does not satisfy the threshold limit, the change request for additional review. For example, the process flow 200 may include sending the change request back to the change management tools and/or enterprise change management system and/or providing the change request and/or information regarding why the confidence score does not satisfy the threshold to one or more users associated with the change request.

Based on determining that the confidence score does not satisfy the threshold limit, the process flow 200 may include providing the change request and/or change request data to the secure tokenization module, as shown in FIG. 2. In some embodiments, the process flow 200 may include validating, with the secure tokenization module, change information of the change request. For example, the process flow 200 may include accessing a deployment tool database and comparing data and/or information in the deployment tool database with the change request and/or the change request data to validate the change information of the change request.

As shown in FIG. 2, the process flow 200 may include extracting (e.g., from the change request and/or the change request data) a change window for the change. For example, the change window may include information identifying an amount of time required to deploy and/or implement the change, an amount of time a configuration item being changed will be unusable while deploying and/or implementing the change, a time period during which the change will be deployed and/or implemented, and/or the like.

As shown in FIG. 2, the process flow 200 may include obtaining, from the deployment tool database, deployment tool details. For example, the deployment tool details may include instructions for deployment tools to implement the change request in the system environment, data identifying, in the deployment tool database, one or more deployment tools to be used to implement and/or deploy the change request in the system environment, and/or the like.

In some embodiments, and as shown in FIG. 2, the process flow 200 may include generating, using a password vault system, a unique token based on the deployment tool details and the change window. For example, the unique token may be a deployment key and/or may include the change window, the deployment tool details, data identifying, in the deployment tool database, one or more deployment tools to be used to implement and/or deploy the change request in the system environment, and/or the like.

As shown in FIG. 2, the process flow 200 may include reading, with the deployment authentication module, the token from the secure tokenization module and determining, with the deployment authentication module, whether the token is valid. Based on determining that the token is not valid, the process flow 200 may include rejecting the change.

In some embodiments, the process flow 200 may include storing, with the deployment authentication module, the token in a database (e.g., the deployment tool database, a token database, a key database, and/or the like) with the change window information. Additionally, or alternatively, the process flow 200 may include using the deployment authentication module as a wrapper around all deployment tools used by an entity irrespective of the technology, platform, and/or the like with which the deployment tool is associated. In some embodiments, the process flow 200 may include using the deployment authentication module as a vault for configuration items in the system environment (e.g., such that a user may only use deployment tools on the configuration items based on a valid authentication of the user and in compliance with the valid token from the secure tokenization module).

As shown in FIG. 2, the process flow 200 may include obtaining, from the employment tool database and based on the token, the deployment tool details and creating an authentication token (e.g., based on the token, the deployment tool details, the change window, and/or the like). In some embodiments, the process flow 200 may include receiving, from a user device associated with a user, authentication credentials associated with the user device and/or the user, as shown in FIG. 2. Additionally, or alternatively, the process flow 200 may include In some embodiments, the process flow 200 may include receiving, from a federated single sign on system, an authentication of a user device and/or a user attempting to access the deployment tools and/or the implementation module to implement the change request.

As shown in FIG. 2, the process flow 200 may include obtaining, based on authentication of a user device and/or a user, the information from the deployment tool database and validating a change package based on the token, the deployment tool details, the change window, instructions for deployment tools to implement the change request, and/or the like. In some embodiments, the process flow 200 may include providing, with the deployment authentication module, access to the implementation module to a user device and/or a user.

As shown in FIG. 2, the process flow 200 may include providing the change package to the implementation module. For example, a release team and/or a deployment team may access the implementation module via the deployment authentication module and implement the change request (e.g., by deploying code with implementation procedures, using the change package, information provided in the change package, and/or the like).

As shown in FIG. 2, the process flow 200 may include providing, with the implementation module, information regarding the implementation process to the cognitive change evaluation and assistance system. For example, the cognitive change evaluation and assistance system may process information regarding the implementation process and assist the implementation module with implementing the change request (e.g., by providing instructions to use one or more of the deployment tools and/or the like).

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for evaluating, validating, and implementing change requests to a system environment based on artificial intelligence input, in accordance with an embodiment of the invention. In some embodiments, one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 300.

As shown in FIG. 3, the process flow 300 may include a cognitive change evaluation and assistance system, which includes historical data, an issue categorization module, a cognitive intelligence module, an assessment module, a change confidence score calculator, and a threshold builder. The process flow 300 may also include a change control module, a secure tokenization module, a deployment authentication module, and an implementation module. In some embodiments, each of the cognitive change evaluation and assistance system, the change control module, the secure tokenization module, the deployment authentication module, and the implementation module of FIG. 3 may be similar to the cognitive change evaluation and assistance system, the change control module, the secure tokenization module, the deployment authentication module, and the implementation module of FIG. 2.

In some embodiments, change requests entered in an enterprise change management system (e.g., similar to that of FIG. 2) may be approved by a change advisory board (e.g., a committee and/or a team of users). Additionally, or alternatively, the process flow 300 may include sending the approved change requests and/or change request data from the approved change requests to an integrated change control gateway system (e.g., similar to that of FIG. 2). For example, the integrated change control gateway system may include the cognitive change evaluation and assistance system, the change control module, the secure tokenization module, the deployment authentication module, and/or the implementation module. In such an example, the integrated change control gateway system may perform an analysis of the approved change requests and/or the change request data from the approved change requests, and, if the change is allowed based on the analysis, the integrated change control gateway system may generate a unique token, which may be passed to deployment tools to implement the change.

As shown in FIG. 3, the process flow 300 may include a data structure (e.g., a database) of historical data associated with change requests (e.g., historical change request data). For example, the historical change request data may include data regarding change management tools associated with historical change requests, data regarding incident management tools associated with historical change requests, data regarding problem management tools associated with historical change requests, data regarding failed changes associated with historical change requests, data regarding emergency changes associated with historical change requests, data regarding incidents caused by changes associated with historical change requests, data regarding successful changes associated with historical change requests, and/or the like.

As shown in FIG. 3, the process flow 300 may include (e.g., with the issue categorization module) reading historical issues with change requests (e.g., from the historical change request data), classifying the issues, and building indexes of the issues. For example, the issue categorization module may include an artificial intelligence module and/or a machine learning module, and the process flow 300 may include reading, in real-time and/or with the artificial intelligence module and/or the machine learning module, the historical change request data and incident problem records of each configuration item of the system environment and categorizing the issues based on the configuration items (e.g., servers, job names, program names, hardware, and/or the like). In some embodiments, the process flow 300 may include reading a change request (e.g., a new change request from the change control module, the enterprise change management system, and/or the like) and identifying, based on the historical change request data, potential issues associated with the change request. Additionally, or alternatively, the process flow 300 may include reading a change request (e.g., a new change request from the change control module, the enterprise change management system, and/or the like) and identifying, using the machine learning module, potential issues associated with the change request. In some embodiments, the process flow 300 may include (e.g., with the issue categorization module) generating, based on the historical change request data, based on the classified issues, based on a change request, based on the indexes, and/or the like, categorized data for a change request (e.g., a new change request from the change control module, the enterprise change management system, and/or the like).

As shown in FIG. 3, the process flow 300 may include reading (e.g., with the cognitive intelligence module) the categorized data from the historical change request data and performing data mining techniques on the categorized data to extract key data and/or information from the historical change request data. In some embodiments, the process flow 300 may include performing data sanitization techniques on the categorized data from the historical change request data and/or the key data and/or information (e.g., to remove duplicated data, similar data, and/or the like) to obtain refined data from the historical change request data.

As shown in FIG. 3, the process flow 300 may include analyzing the refined data from the historical change request data with natural language processing algorithms, cognitive learning algorithms, deep learning algorithms, and/or the like. In some embodiments, the process flow 300 may include assigning, based on the analysis by the natural language processing algorithms, cognitive learning algorithms, deep learning algorithms, and/or the like, a likelihood of negatively impacting the system environment to each change in the historical change request data. Additionally, or alternatively, the process flow 300 may include assigning the likelihood of negatively impacting the system environment based on a criticality of a configuration item.

As shown in FIG. 3, the process flow 300 may include building, based on the assigned likelihoods, inferences associated with changes to the system environment. In some embodiments, the process flow 300 may include storing the inferences in a change inference database, as shown in FIG. 3. Additionally, or alternatively, and as shown in FIG. 3, the process flow 300 may include identifying, based on the analysis by the natural language processing algorithms, cognitive learning algorithms, deep learning algorithms, and/or the like, implementation issues for the changes in the historical change request data and storing the identified implementation issues in an implementation issue database.

As shown in FIG. 3, the process flow 300 may include reading (e.g., with the assessment module) a change request (e.g., a new change request from the change control module, the enterprise change management system, and/or the like) and performing data mining techniques on the change request to extract key data and/or information from the change request. In some embodiments, the process flow 300 may include performing data sanitization techniques on the change request data.

As shown in FIG. 3, the process flow 300 may include determining, based on the change inference database, inferences associated with the change request, such as a likelihood of the change request negatively impacting the system environment. Additionally, or alternatively, the process flow 300 may include analyzing the change request with natural language processing algorithms, cognitive learning algorithms, deep learning algorithms, and/or the like. In some embodiments, the process flow 300 may include assigning, based on the analysis by the natural language processing algorithms, cognitive learning algorithms, deep learning algorithms, and/or the like, a likelihood of the change request negatively impacting the system environment. Additionally, or alternatively, the process flow 300 may include evaluating, based on the change inference database and/or the analysis by the natural language processing algorithms, cognitive learning algorithms, deep learning algorithms, and/or the like, a change failure impact associated with the change request.

As shown in FIG. 3, the process flow 300 may include generating, based on the inferences associated with the change request, the likelihood of the change request negatively impacting the system environment, the analysis by the natural language processing algorithms, cognitive learning algorithms, deep learning algorithms, and/or the like, a change impact statement associated with the change request. In some embodiments, the process flow 300 may include identifying, with the assessment module, potential failure points associated with the change request.

As shown in FIG. 3, the process flow 300 may include reading (e.g., with the change confidence score calculator) the change impact statement and calculating a change confidence score for the change request. In some embodiments, the process flow 300 may include calculating the change confidence score using an artificial intelligence module and/or a machine learning module. For example, the artificial intelligence module and/or the machine learning module may be trained, based on the historical change request data, to receive change impact statements and/or change requests and determine change confidence scores for the change impact statements and/or change requests. In some embodiments, the change confidence score calculator may use a mathematical algorithm to calculate the change confidence score. Additionally, or alternatively, the change confidence score may be a probability of successful deployment and/or implementation of the change request in the system environment without negatively impacting the system environment (e.g., configuration items in the system environment).

As shown in FIG. 3, the process flow 300 may include reading (e.g., with the threshold builder) the historical change request data and determining threshold limits for each configuration item in the system environment. In some embodiments, the process flow 300 may include determining the threshold limits using an artificial intelligence module and/or a machine learning module. For example, the artificial intelligence module and/or the machine learning module may be trained, based on the historical change request data, to receive change requests and determine threshold limits for the change requests. In some embodiments, the artificial intelligence module and/or the machine learning module may be re-trained continuously in real-time as the historical change request data is updated with change requests that have been implemented in the system environment and results of the change requests implementation. Additionally, or alternatively, the process flow 300 may include adjusting the threshold limits each time a change request, an incident, and/or a problem is opened for a configuration item. In some embodiments, the threshold limits may be baselines for approving any change in production.

As shown in FIG. 3, the process flow 300 may include providing the change confidence score to the change control module and comparing (e.g., with the change control module) the change confidence score to the threshold limits. For example, the process flow 300 may include determining whether the change confidence score satisfies the threshold limits and/or the like. In some embodiments, the process flow 300 may include determining whether the change confidence score satisfies each threshold limit for each configuration item impacted by the change request.

Additionally, or alternatively, the process flow 300 may include providing, based on determining that the change confidence score does not satisfy the threshold limits, information regarding the historical inferences from the change inference database and the change request to a user and/or a user device associated with the change request (e.g., a change coordinator and/or the like). In some embodiments, the process flow 300 may include, based on determining that the change confidence score does satisfy the threshold limits, approving the change request and/or providing the change request to the secure tokenization module.

Additionally, or alternatively, the process flow 300 may include creating (e.g., with the secure tokenization module) a secure token including and/or based on the change request, details of the change request, a change window of the change request, and/or the like. In some embodiments, the process flow 300 may include creating the secure token such that the secure token is only valid during the change window.

Additionally, or alternatively, the deployment authentication module may be integrated with the secure tokenization module and may receive the secure token. In some embodiments, federated single sign on systems may be used to integrate the systems to authentication credentials along with a token generated by Password Vault. For example, if the change of the change request is related to a legacy system then, the deployment authentication module may convert the token into a legacy data format and pass the converted token to a legacy identity access management server. In some embodiments, when the change window begins, the change may be authenticated with authentication credentials and the secure token, and the change may be deployed. For example, if the change is a web-based tool, the change may be passed to a federated single sign on system which authenticates the token.

As shown in FIG. 3, the process flow 300 may include implementing (e.g., with the implementation module) the change (e.g., a code change and/or the like) in production. In some embodiments, the process flow 300 may include accessing, based on encountering an issue during implementation, the implementation issue database and addressing the issues during implementation based on the data in the implementation issue database.

Additionally, or alternatively, for change requests (e.g., releases) including changes to multiple configuration items (e.g., components), the process flow 300 may include generating a secure token (e.g., a deployment key) for each configuration item for which a change was approved by the change control module. In some embodiments, for change requests (e.g., releases) including changes to multiple configuration items (e.g., components), the process flow 300 may include generating the same secure token (e.g., deployment key) for all of the configuration items for which a change was approved by the change control module.

In some embodiments, the process flow 300 may include updating, based on implementing the change request, the historical change request data to include the change request and a result of the change request (e.g., a failed change, an emergency change, an incident caused by a change, a successful change, and/or the like). Additionally, or alternatively, the process flow 300 may include updating, retraining, and/or the like modules, components, databases, and/or the like of the cognitive change evaluation and assistance system using the updated historical change request data.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4 illustrates a process flow 400 for evaluating, validating, and implementing change requests to a system environment based on artificial intelligence input, in accordance with an embodiment of the invention. In some embodiments, one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 400.

As shown in block 402, the process flow 400 may include receiving a change request including a change to be made to a configuration item of a system environment. For example, an integrated change control gateway system may receive a change request including a change to be made to a configuration item of a system environment.

As shown in block 404, the process flow 400 may include determining, based on a change inference database, potential failure points associated with deploying the change request in the system environment, where the change inference database is generated based on historical change request data. For example, an integrated change control gateway system may determine, based on a change inference database, potential failure points associated with deploying the change request in the system environment. In some embodiments, the change inference database may be generated based on historical change request data.

As shown in block 406, the process flow 400 may include determining, based on the potential failure points, a confidence score for the change. For example, an integrated change control gateway system may determine, based on the potential failure points, a confidence score for the change.

As shown in block 408, the process flow 400 may include determining whether the confidence score for the change satisfies a threshold limit for the configuration item, where the threshold limit is a baseline value to approve changes to the configuration item. For example, an integrated change control gateway system may determine whether the confidence score for the change satisfies a threshold limit for the configuration item. In some embodiments, the threshold limit may be a baseline value to approve changes to the configuration item.

As shown in block 410, the process flow 400 may include preventing the change request from being deployed in the system environment until the confidence score for the change satisfies the threshold limit for the configuration item. For example, an integrated change control gateway system may prevent the change request from being deployed in the system environment until the confidence score for the change satisfies the threshold limit for the configuration item.

As shown in block 412, the process flow 400 may include generating, based on determining that the confidence score for the change satisfies the threshold limit for the configuration item, an authentication token including instructions for deployment tools. For example, an integrated change control gateway system may generate, based on determining that the confidence score for the change satisfies the threshold limit for the configuration item, an authentication token including instructions for deployment tools.

As shown in block 414, the process flow 400 may include implementing, using the deployment tools and based on the instructions, the change request in the system environment. For example, an integrated change control gateway system may implement, using the deployment tools and based on the instructions, the change request in the system environment.

Process flow 400 may include additional embodiments, such as any single embodiment or any combination of embodiments described below and/or in connection with one or more other processes described elsewhere herein.

In a first embodiment, the process flow 400 may include generating, based on the historical change request data, the change inference database.

In a second embodiment alone or in combination with the first embodiment, the process flow 400 may include when generating the change inference database, generating the change inference database using a first machine learning model, where the first machine learning model is trained based on the historical change request data.

In a third embodiment alone or in combination with any of the first through second embodiments, the process flow 400 may include, when generating the change inference database, analyzing the historical change request data using natural language processing, and, when determining the potential failure points associated with deploying the change request in the system environment, analyzing the change request using the natural language processing.

In a fourth embodiment alone or in combination with any of the first through third embodiments, the process flow 400 may include, after implementing the change request in the system environment, retraining the first machine learning model based on the historical change request data, the change request, and/or an outcome of implementing the change request in the system environment and updating the change inference database using the first machine learning model.

In a fifth embodiment alone or in combination with any of the first through fourth embodiments, the process flow 400 may include determining, based on the historical change request data, the threshold limit for each configuration item of the system environment.

In a sixth embodiment alone or in combination with any of the first through fifth embodiments, the process flow 400 may include, when determining the threshold limit for each configuration item of the system environment, determining the threshold limit for each configuration item of the system environment using a second machine learning model, where the second machine learning model is trained based on the historical change request data.

In a seventh embodiment alone or in combination with any of the first through sixth embodiments, the process flow 400 may include, after implementing the change request in the system environment, retraining the second machine learning model based on the historical change request data, the change request, and an outcome of implementing the change request in the system environment and updating the threshold limit for each configuration item of the system environment using the second machine learning model.

In an eighth embodiment alone or in combination with any of the first through seventh embodiments, the process flow 400 may include, when preventing the change request from being deployed in the system environment, generating, based on determining that the confidence score for the change satisfies the threshold limit for the configuration item, based on the change, and based on a change window for the change request, a secure token for the change request, where the secure token is only valid during the change window.

In a ninth embodiment alone or in combination with any of the first through eighth embodiments, the process flow 400 may include, when preventing the change request from being deployed in the system environment, determining whether the secure token is valid.

In a tenth embodiment alone or in combination with any of the first through ninth embodiments, the process flow 400 may include, when generating the authentication token, generating the authentication token based on determining that the secure token is valid, based on a deployment tool database, and based on the secure token.

In an eleventh embodiment alone or in combination with any of the first through tenth embodiments, the change request may include multiple changes to be made to the configuration item and other changes to be made to other configuration items of the system environment, and the process flow 400 may include, when determining the confidence score, determining, based on the potential failure points, confidence scores for the multiple changes and other confidence scores for the other changes and, when determining whether the confidence score for the change satisfies the threshold limit for the configuration item, determining whether the confidence scores for the multiple changes satisfy the threshold limit for the configuration item and determining whether the other confidence scores for the other changes satisfy other threshold limits for the other configuration items.

In a twelfth embodiment alone or in combination with any of the first through eleventh embodiments, the process flow 400 may include determining, based on the historical change request data, classifications for historical change requests, where the classifications include configuration items of the system environment and determining, based on the change request, the classifications impacted by the change request.

In a thirteenth embodiment alone or in combination with any of the first through twelfth embodiments, the confidence score may be a probability of successful implementation of the change request in the system environment without negatively impacting other configuration items in the system environment.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

As noted above, in some embodiments, the process flows described herein may include performing one or more of the functions described herein using artificial intelligence, machine learning, a machine learning model, a machine learning module, natural language processing, cognitive learning, and/or the like. For example, the system may provide data associated with change requests to a system environment to a machine learning model trained (e.g., using historical change request data, outcomes of historical change requests, and/or the like) to output inferences regarding change requests, issues encountered when implementing change requests, confidence scores for change requests, threshold limits for configuration items, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on historical data associated with change requests, outcomes of historical change requests, and/or the like over a predetermined past period of time. In doing so, the system may be configured to generate inferences regarding change requests, issues encountered when implementing change requests, confidence scores for change requests, threshold limits for configuration items, and/or the like. In some embodiments, the one or more machine learning algorithms may be used to calculate likelihoods, and whether the likelihoods satisfy a threshold. Additionally, or alternatively, the system may continuously re-train the machine learning model using change request data and implementation outcomes of change requests analyzed and implemented by the system.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for evaluating, validating, and implementing change requests to a system environment based on artificial intelligence input, the system comprising:
   at least one non-transitory storage device; and
   at least one processing device coupled to the at least one non-transitory storage device, wherein the at least one processing device is configured to:
      receive a change request comprising a change to be made to a configuration item of a system environment;
      determine, based on a change inference database, potential failure points associated with deploying the change request in the system environment, wherein the change inference database is generated based on historical change request data;
      determine, based on the potential failure points, a confidence score for the change;
      determine whether the confidence score for the change satisfies a threshold limit for the configuration item, wherein the threshold limit is a baseline value to approve changes to the configuration item;
      prevent the change request from being deployed in the system environment until the confidence score for the change satisfies the threshold limit for the configuration item by:
         generating, based on determining that the confidence score for the change satisfies the threshold limit for the configuration item, based on the change, and based on a change window for the change request, a secure token for the change request, wherein the secure token is only valid during the change window; and
         determining whether the secure token is valid;
      generate, based on determining that the secure token is valid, based on a deployment tool database, based on the secure token, and based on determining that the confidence score for the change satisfies the threshold limit for the configuration item, an authentication token comprising instructions for deployment tools; and
      implement, using the deployment tools and based on the instructions, the change request in the system environment.

2. The system of claim 1, wherein the at least one processing device is configured to generate, based on the historical change request data, the change inference database.

3. The system of claim 2, wherein the at least one processing device is configured to, when generating the change inference database, generate the change inference database using a first machine learning model, wherein the first machine learning model is trained based on the historical change request data.

4. The system of claim 3, wherein the at least one processing device is configured to:
   when generating the change inference database, analyze the historical change request data using natural language processing; and
   when determining the potential failure points associated with deploying the change request in the system environment, analyze the change request using the natural language processing.

5. The system of claim 3, wherein the at least one processing device is configured to, after implementing the change request in the system environment:
   retrain the first machine learning model based on the historical change request data, the change request, and an outcome of implementing the change request in the system environment; and
   update the change inference database using the first machine learning model.

6. The system of claim 1, wherein the at least one processing device is configured to determine, based on the historical change request data, the threshold limit for each configuration item of the system environment.

7. The system of claim 6, wherein the at least one processing device is configured to, when determining the threshold limit for each configuration item of the system environment, determine the threshold limit for each configuration item of the system environment using a second machine learning model, wherein the second machine learning model is trained based on the historical change request data.

8. The system of claim 7, wherein the at least one processing device is configured to, after implementing the change request in the system environment:
   retrain the second machine learning model based on the historical change request data, the change request, and an outcome of implementing the change request in the system environment; and
   update the threshold limit for each configuration item of the system environment using the second machine learning model.

9. The system of claim 1, wherein the change request comprises multiple changes to be made to the configuration item and other changes to be made to other configuration items of the system environment, and wherein the at least one processing device is configured to:
   when determining the confidence score, determine, based on the potential failure points, confidence scores for the multiple changes and other confidence scores for the other changes; and
   when determining whether the confidence score for the change satisfies the threshold limit for the configuration item:
      determine whether the confidence scores for the multiple changes satisfy the threshold limit for the configuration item; and
      determine whether the other confidence scores for the other changes satisfy other threshold limits for the other configuration items.

10. The system of claim 1, wherein the at least one processing device is configured to:
    determine, based on the historical change request data, classifications for historical change requests, wherein the classifications comprise configuration items of the system environment; and
    determine, based on the change request, the classifications impacted by the change request.

11. The system of claim 1, wherein the confidence score is a probability of successful implementation of the change request in the system environment without negatively impacting other configuration items in the system environment.

12. A computer program product for evaluating, validating, and implementing change requests to a system environment based on artificial intelligence input, the computer program product comprising a non-transitory computer-readable medium comprising code causing a first apparatus to:
- receive a change request comprising a change to be made to a configuration item of a system environment;
- determine, based on a change inference database, potential failure points associated with deploying the change request in the system environment, wherein the change inference database is generated based on historical change request data;
- determine, based on the potential failure points, a confidence score for the change;
- determine whether the confidence score for the change satisfies a threshold limit for the configuration item, wherein the threshold limit is a baseline value to approve changes to the configuration item;
- prevent the change request from being deployed in the system environment until the confidence score for the change satisfies the threshold limit for the configuration item by:
  - generating, based on determining that the confidence score for the change satisfies the threshold limit for the configuration item, based on the change, and based on a change window for the change request, a secure token for the change request, wherein the secure token is only valid during the change window; and
  - determining whether the secure token is valid;
- generate, based on determining that the secure token is valid, based on a deployment tool database, based on the secure token, and based on determining that the confidence score for the change satisfies the threshold limit for the configuration item, an authentication token comprising instructions for deployment tools; and
- implement, using the deployment tools and based on the instructions, the change request in the system environment.

13. The computer program product of claim 12, wherein the non-transitory computer-readable medium comprises code causing the first apparatus to generate, based on the historical change request data, the change inference database.

14. The computer program product of claim 13, wherein the non-transitory computer-readable medium comprises code causing the first apparatus to, when generating the change inference database, generate the change inference database using a first machine learning model, wherein the first machine learning model is trained based on the historical change request data.

15. The computer program product of claim 14, wherein the non-transitory computer-readable medium comprises code causing the first apparatus to:
- when generating the change inference database, analyze the historical change request data using natural language processing; and
- when determining the potential failure points associated with deploying the change request in the system environment, analyze the change request using the natural language processing.

16. The computer program product of claim 14, wherein the non-transitory computer-readable medium comprises code causing the first apparatus to, after implementing the change request in the system environment:
- retrain the first machine learning model based on the historical change request data, the change request, and an outcome of implementing the change request in the system environment; and
- update the change inference database using the first machine learning model.

17. A method for evaluating, validating, and implementing change requests to a system environment based on artificial intelligence input, the method comprising:
- receiving a change request comprising a change to be made to a configuration item of a system environment;
- determining, based on a change inference database, potential failure points associated with deploying the change request in the system environment, wherein the change inference database is generated based on historical change request data;
- determining, based on the potential failure points, a confidence score for the change;
- determining whether the confidence score for the change satisfies a threshold limit for the configuration item, wherein the threshold limit is a baseline value to approve changes to the configuration item;
- preventing the change request from being deployed in the system environment until the confidence score for the change satisfies the threshold limit for the configuration item by:
  - generating, based on determining that the confidence score for the change satisfies the threshold limit for the configuration item, based on the change, and based on a change window for the change request, a secure token for the change request, wherein the secure token is only valid during the change window; and
  - determining whether the secure token is valid;
- generating, based on determining that the secure token is valid, based on a deployment tool database, based on the secure token, and based on determining that the confidence score for the change satisfies the threshold limit for the configuration item, an authentication token comprising instructions for deployment tools; and
- implementing, using the deployment tools and based on the instructions, the change request in the system environment.

18. The method of claim 17, comprising generating, based on the historical change request data, the change inference database.

19. The method of claim 18, wherein generating the change inference database comprises generating the change inference database using a first machine learning model, wherein the first machine learning model is trained based on the historical change request data.

20. The method of claim 19, wherein:
- generating the change inference database comprises analyzing the historical change request data using natural language processing; and
- determining the potential failure points associated with deploying the change request in the system environment comprises analyzing the change request using the natural language processing.

* * * * *

UNITED STATES PATENT AND TRADEMARK OFFICE
CERTIFICATE OF CORRECTION

| | | |
|---|---|---|
| PATENT NO. | : 11,966,479 B2 | Page 1 of 1 |
| APPLICATION NO. | : 17/582282 | |
| DATED | : April 23, 2024 | |
| INVENTOR(S) | : Khandavally Shiva Ranga Prasad | |

It is certified that error appears in the above-identified patent and that said Letters Patent is hereby corrected as shown below:

On the Title Page

Item (72) (Name of Inventor), "Khandavally Siva Ranga Prasad" is changed to "Khandavally Shiva Ranga Prasad"

Signed and Sealed this
Twenty-seventh Day of August, 2024

Katherine Kelly Vidal
*Director of the United States Patent and Trademark Office*